United States Patent
Min

(10) Patent No.: US 8,355,078 B2
(45) Date of Patent: Jan. 15, 2013

(54) HDMI TRANSMISSION SYSTEMS FOR DELIVERING IMAGE SIGNALS AND PACKETIZED AUDIO AND AUXILIARY DATA AND RELATED HDMI TRANSMISSION METHODS

(75) Inventor: Byung-Ho Min, Seoul (KR)

(73) Assignee: Samsung Electronics Co., Ltd. (KR)

(*) Notice: Subject to any disclaimer, the term of this patent is extended or adjusted under 35 U.S.C. 154(b) by 1957 days.

(21) Appl. No.: 11/456,169

(22) Filed: Jul. 7, 2006

(65) Prior Publication Data

US 2007/0011720 A1 Jan. 11, 2007

(30) Foreign Application Priority Data

Jul. 8, 2005 (KR) .................. 10-2005-0061833

(51) Int. Cl.
*H04N 7/00* (2006.01)
(52) U.S. Cl. .................. 348/461; 348/462; 348/464
(58) Field of Classification Search .................. 348/461, 348/462, 464–467, 476–485, 512, 515, 518, 348/723, 473; *H04N 7/00, 11/00, 9/475, H04N 5/38*
See application file for complete search history.

(56) References Cited

U.S. PATENT DOCUMENTS

| 5,523,795 A | 6/1996 | Ueda |
| 6,072,832 A | 6/2000 | Katto |
| 6,151,334 A | 11/2000 | Kim et al. |
| 2001/0036193 A1 | 11/2001 | Kori |
| 2002/0136241 A1 | 9/2002 | Pasqualino et al. |
| 2002/0163598 A1 | 11/2002 | Pasqualino |
| 2003/0037342 A1 | 2/2003 | Pasqualino |
| 2004/0252235 A1 | 12/2004 | Ejima |
| 2007/0024629 A1* | 2/2007 | Frederick et al. ............. 345/520 |

FOREIGN PATENT DOCUMENTS

| JP | 2001-251385 | 9/2001 |
| JP | 2004-023187 | 1/2004 |
| KR | 10385033 | 7/1995 |
| KR | 10-2001-0088402 A | 9/2001 |
| KR | 10-2004-0029034 A | 3/2004 |
| KR | 2004-42001 A | 5/2004 |
| KR | 10200442001 | 5/2004 |
| KR | 1020050012515 | 2/2005 |
| KR | 1020050022268 | 3/2005 |
| WO | WO 03/058376 A3 | 7/2003 |

OTHER PUBLICATIONS

Notice to File a Response/Amendment to the Examination Report for Korean Patent Application No. 2005-61833.

(Continued)

*Primary Examiner* — Sherrie Hsia
(74) *Attorney, Agent, or Firm* — Myers Bigel Sibley & Sajovec

(57) ABSTRACT

A transmission system is capable of packetizing audio and auxiliary data in compliance with an HDMI standard. The transmission system may include a register set block that may be configured to store video formation information and/or a transmission enable signal; a data packet block that may be configured to generate a first signal, packetize the audio and/or auxiliary data in response to the transmission enable signal, and output packet data in response to a control signal; and a control signal generator that may be configured to output the control signal in response to the video formation information and the first signal.

21 Claims, 11 Drawing Sheets

OTHER PUBLICATIONS

English translation of Notice to File a Response/Amendment to the Examination Report for Korean Patent Application No. 2005-61833.

Notice to file a Response/Amendment to the Examination Report for Application No. 10-2005-0061833; dated Nov. 16, 2006.

English translation of Notice to file a Response/Amendment to the Examination Report for Application No. 10-2005-0061833; dated Nov. 16, 2006.

UK Search and Examination Report for GB0613585.9; dated Oct. 20, 2006.

* cited by examiner

HDMI TRANSMISSION SYSTEMS FOR DELIVERING IMAGE SIGNALS AND PACKETIZED AUDIO AND AUXILIARY DATA AND RELATED HDMI TRANSMISSION METHODS

CROSS-REFERENCE TO RELATED APPLICATIONS

This U.S. non-provisional patent application claims priority under 35 U.S.C. §119 from Korean Patent Application No. 2005-61833 filed on Jul. 8, 2005, the entire contents of which are hereby incorporated by reference as if set forth in its entirety.

FIELD OF THE INVENTION

The subject matter disclosed herein relates to transmission systems and, more particularly, to transmission systems that deliver image signals and digital audio signals.

BACKGROUND

The High-Definition Multimedia Interface (HDMI) is a standard for transmitting digital television audiovisual signals from a DVD player, a set-top box or another audiovisual resource to a television set, a projector, a monitor or other video display apparatus. HDMI may support multi-channel audio data with high quality, and is applicable to numerous standards and high-definition (HD) electronic video formats. HDMI may also be used with respect to content protection technology. HDMI systems may allow the delivery of decompressed baseband digital-HD video and audio signals with little or no loss, and are readily linkable by means of a two-ply cable. HDMI systems may also be used to consolidate control operations between apparatuses, and can transfer content with high resolution.

While HDMI is adaptable to the standard for transferring a component video signal and a decompressed audio signal at the same time, it uses a transition-minimized differential signaling (TMDS) conversion scheme as a general transmission mode. Pursuant to this TMDS conversion scheme, parallel data is modulated at the transmission site, and the modulated signal is demodulated at the reception site.

HDMI utilizes packet data structures to transmit data over the TMDS channels. The packet data includes audio data, auxiliary data and error correction codes. These data are processed by various methods to provide a TMDS encoder.

HDMI transfers video signals, including active video data and blanking periods for horizontal and vertical synchronization signals. Digital audio and auxiliary data may be transferred during the blanking periods, but such data may be transmitted at different points. Thus, the auxiliary data is transferred at an appropriate time after it is prepared for transmission.

SUMMARY

Transmission systems that are configured to packetize audio and auxiliary data in accordance with the HDMI standard are provided, as are methods of packetizing such data.

Pursuant to certain embodiments of the present invention, methods for transferring audio and auxiliary data in a video frame are provided in which video formation information and the audio and auxiliary data are received. In these methods, a transmission enable signal and a first signal are activated. Additionally, the audio and auxiliary data is packetized (i.e., formed into data packets). In response to the first signal, a determination is made as to whether a current pixel in the video frame is in a position that is suitable for transmission of the packetized audio and auxiliary data. This determination may be based, at least in part, on at least some of the video formation information. The packetized audio and auxiliary data is output in these methods in response to determining that the current pixel in the video frame is in a position that is suitable for transmission of the packetized audio and auxiliary data.

In certain embodiments, the determination as to whether a current pixel in the video frame is in a position that is suitable for transmission of the packetized audio and auxiliary data may involve determining if sufficient time remains in a horizontal line of the video frame from the activation of the first signal to transfer a first unit of the packetized audio and auxiliary data, and then activating a second signal if it is determined that sufficient time remains. This determination may also include determining whether a time corresponding to a size of the first unit has lapsed from an activation point of the second signal.

In some embodiments, these methods may further include counting the cycles of a pixel clock to generate a first value and counting the cycles of the pixel clock starting at the activation of the second signal to generate a second value. In such embodiments, the first value may be reset in response to a horizontal sync signal and a vertical sync signal. The second value may be reset in response to deactivation of the second signal.

In further embodiments of these methods, outputting the packetized audio and auxiliary data in response to determining that the current pixel in the video frame is in a position that is suitable for transmission of the packetized audio and auxiliary data may comprise outputting the packetized audio and auxiliary data when the second value is two cycles less than the number of clock cycles which is necessary for transferring the first unit.

Pursuant to further embodiments of the present invention, transmission systems are provided which include a data packet block and a control signal generator. The data packet block may be configured to generate a first signal, form one or more data packets containing auxiliary data and/or audio data in response to a transmission enable signal, and output the one or more data packets in response to a control signal. The control signal generator may be configured to output the control signal in response to video formation information and the first signal from the data packet block. The transmission system may operate in accordance with a high-definition multimedia interface (HDMI) standard. The one or more data packets may be suitable for transmission through a transition-minimized differential signaling (TMDS) channel.

The transmission system may also include a register set block that is configured to store the video formation information and the transmission enable signal. The register set block may also be configured to store the auxiliary data. The register set block may include a plurality of registers that are configured to store the video formation information and the auxiliary data and an interface circuit that is configured to receive the video formation information from the external source and to store the video formation information into the plurality of registers.

In some embodiments, the data packet block may be operable at a plurality of states corresponding to the audio data and the auxiliary data, and may activate a ready signal in response to entering each state. The data packet block outputs the one or more data packets in response to the transmission enable signal and the control signal. The data packet block may also be configured to form the one or more data packets in each state when the transmission enable signal is active and the control signal is at a first level. The data packet block may transition to the next state when the transmission enable signal becomes inactive or the control signal is set to a second level.

In certain embodiments, the control block may include first and second counters, a signal generator and a control signal generator. The first counter may be configured to generate a first value based on a count of a pixel clock signal, and the second counter may be configured to generate a second value based on a count of the pixel clock signal. The signal generator may be configured to output a second signal based on the first and second values and the video formation information. The control signal generator may be configured to output the control signal based on the second signal and the second value.

In certain embodiments, the first counter may be reset in response to a horizontal sync signal and a vertical sync signal. The signal generator may activate the second signal when the first signal is active and the first value indicates that the current pixel is in a portion of the video frame that may include a data packet. The signal generator may inactivate the second signal when the second value is one less than a size of one of the one or more data packets. The second counter may start counting in response to the activation of the second signal, and may be reset in response to the deactivation of the second signal. The control signal generator may be configured to set the control signal to the first level in response to the deactivation of the second signal. The control signal generator may also be configured to set the control signal to the second level when the second value is within two of a size of one of the one or more data packets.

BRIEF DESCRIPTION OF THE FIGURES

The accompanying drawings, which are included to provide a further understanding of the invention and are incorporated in and constitute a part of this application, illustrate certain embodiment(s) of the invention. In the drawings.

DETAILED DESCRIPTION

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this disclosure and the relevant art and will not be interpreted in an idealized or overly formal sense unless expressly so defined herein.

Figure 1:
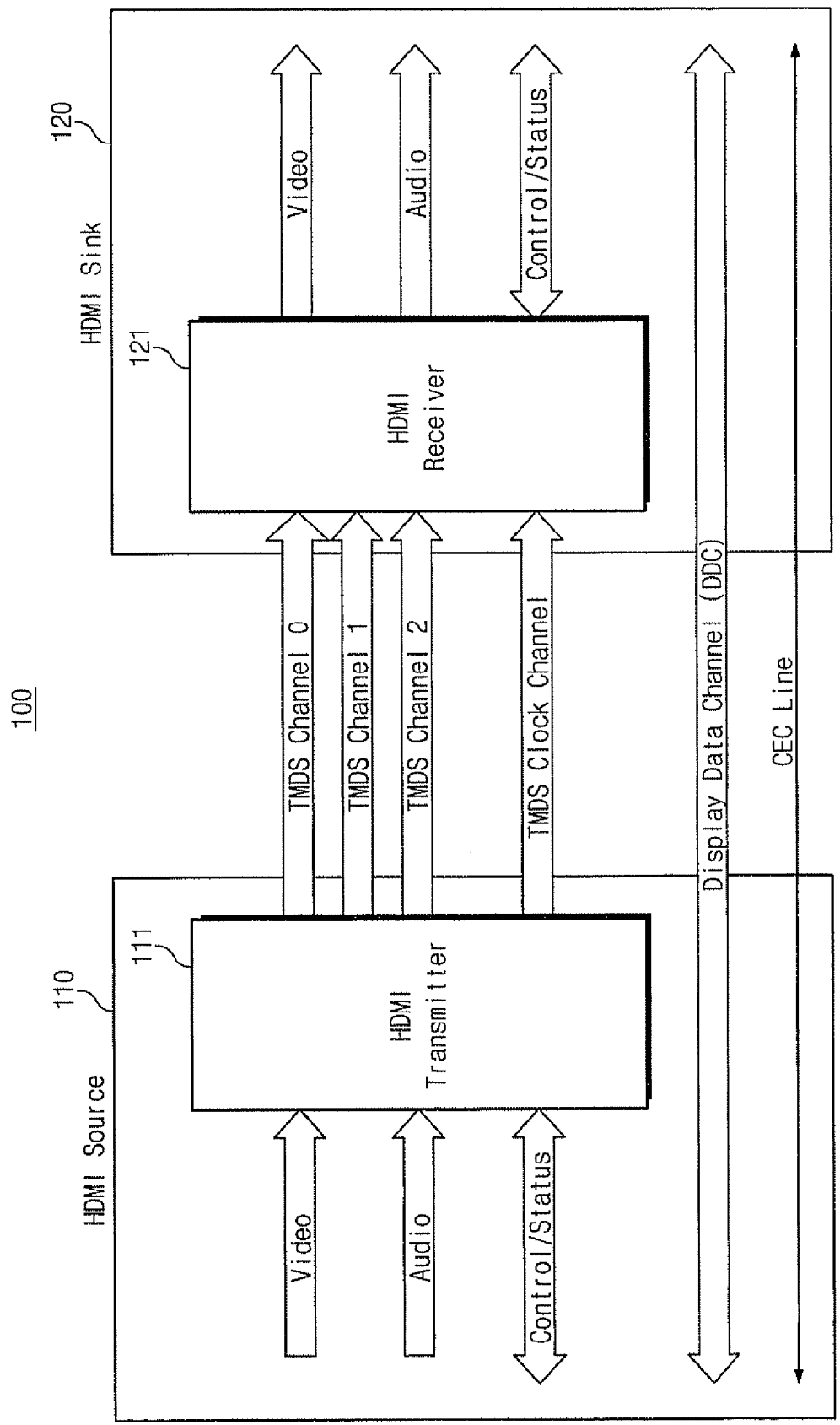
FIG. 1 is a block diagram of an HDMI system architecture.

FIG. 1 is a block diagram illustrating the architecture of an HDMI system 100. The HDMI system 100 includes an HDMI source 110 and an HDMI sink 120. The system 100 has one or more HDMI inputs and outputs. Each HDMI input accords to all of the rules for the HDMI sink 120 and each HDMI output accords to all of the rules for the HDMI source 110.

HDMI cables and connectors transfer four differential signals. The differential signals include a plurality of TMDS data channels and a clock channel that are provided between the HDMI source 110 and the HDMI sink 120. As shown in FIG. 1, three TMDS data channels are provided (TMDS Channels 0-2). These channels are used to transfer video, audio and auxiliary data from the HDMI source 110 to the HDMI sink 120.

Video pixel clock signals are transferred through the fourth channel, which is a TMDS clock channel. These video pixel clock signals are used as frequency references for data recovery on the three TMDS data channels. The video data is composed of serial 24-bit pixels that is transferred through the three TMDS data channels. The audio data and the auxiliary data are transferred through the TMDS channels in the packet structure of HDMI.

An HDMI transmitter 111 converts input video, audio and control/status data into a format suitable for transmission over the TMDS data channels, and transfers the converted data to an HDMI receiver 121 through the TMDS data channels. The HDMI receiver 121 restores the data that is received over the TMDS data channels into its original format.

The HDMI linking operations may include three modes, namely a video data period, a data island period, and a control period. During the video data period, active pixels of an active video line are transferred from the HDMI source 110 to the HDMI sink 120. During the data island period, the audio data and the auxiliary data are transferred from the HDMI source 110 to the HDMI sink 120 in the form of serial packets. The control period is used when there is no transmission of video, audio or auxiliary data. These three periods may be arranged in the pixel array as shown in FIG. 2.

Figure 2:
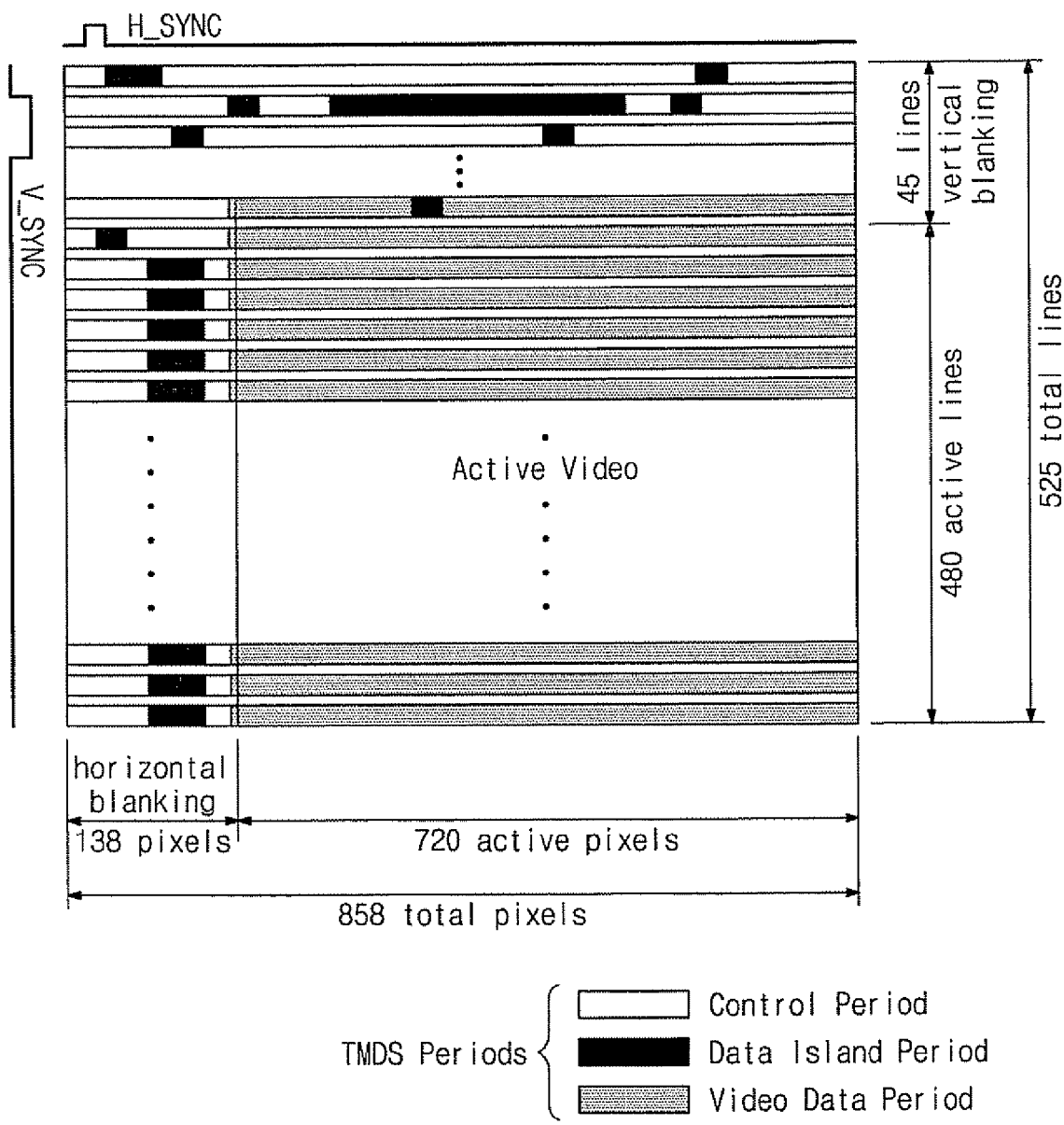
FIG. 2 is a diagram of a pixel arrangement showing video data, data island, and control periods.

The exemplary pixel array shown in FIG. 2 has a size of 858*525 pixels. As shown in FIG. 2, the active region comprises 720*480 pixels (i.e., has a resolution of 720*480 pixels). An additional 138 horizontal blanking pixels are provided, as are an additional 45 vertical blanking lines. In this exemplary pixel array, the top 45 lines are referred as the "vertical blanking field", while the leftmost 138-pixel region within the lower 480 lines is referred as the "horizontal blanking field." It will be appreciated that the resolution of the active region, the number of horizontal blanking pixels, and the number of vertical blanking lines in the array of FIG. 2 are exemplary values and may be varied in other embodiments of the present invention.

As illustrated in FIG. 2, the audio data and the auxiliary data may be input at various timing points in the blanking fields. Embodiments of the present invention provide an HDMI transmission system capable of packetizing the audio data and the auxiliary data in the blanking fields and transferring the packetized data from the HDMI source 110 to the HDMI sink 120.

Figure 3:
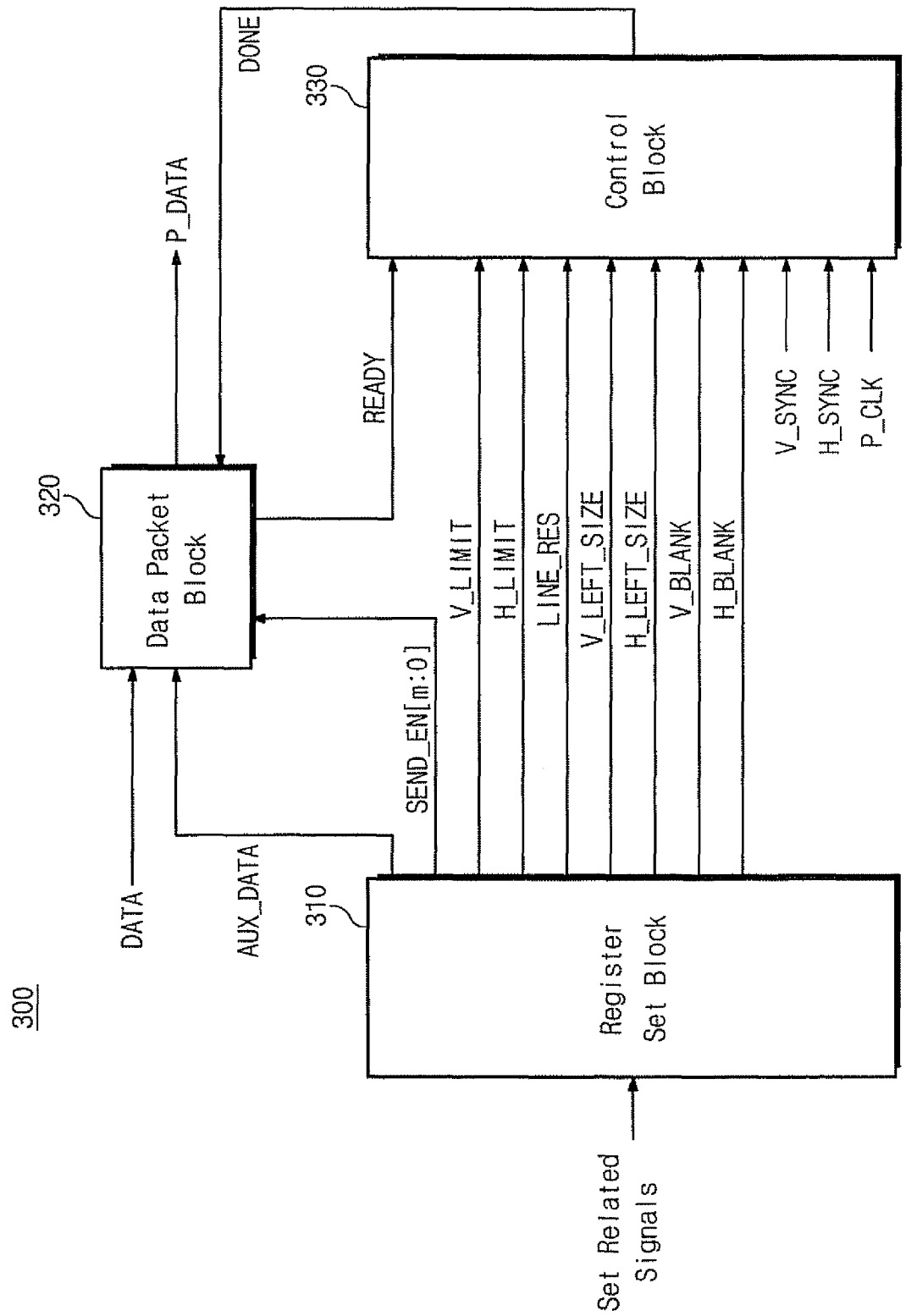
FIG. 3 is a block diagram illustrating a transmission system in accordance with embodiments of the present invention.

FIG. 3 is a block diagram illustrating a transmission system 300 in accordance with some embodiments of the present invention. As shown in FIG. 3, the transmission system 300 includes a register set block 310, a data packet block 320 and a control block 330. The transmission system 300 may be part of the HDMI transmitter 111 of FIG. 1. Packet data output from the transmission system 300 is converted into TMDS data and transferred to the HDMI sink 120 via the TMDS channels.

The register set block 310 stores video formation information, auxiliary data AUX_DATA and states of control signals. The control signals may include transfer enabling signals SEND_EN[m:0] of m+1 bits each corresponding to the audio data and the auxiliary data.

The video formation information may include, for example, vertical limit data (V_LIMIT), horizontal limit data (H_LIMIT), horizontal resolution data (LINE_RES), vertical size data (V_LEFT_SIZE), horizontal size data (H_LEFT_SIZE), vertical blank data (V_BLANK) and horizontal blank data (H_BLANK), each of which may comprise a plurality of bits.

The vertical limit data V_LIMIT represents the size of the audio/auxiliary data packet, i.e., a data island period, when a current pixel is located in the vertical blanking field. The vertical limit V_LIMIT may be defined as shown in Equation 1.

$$V\_LIMIT = DataPacket + CRCcycle + ControlPreamble + \\ LeadingGuardBand + TrailingGuardBand \quad \text{[Equation 1]}$$

In Equation 1, "DataPacket" refers to the packet data size when the audio and auxiliary data are packetized, and "CRCcycle" (CRC means cyclic redundancy checking) refers to the size of an error correction code (ECC). "ControlPreamble" refers to the size of the preamble transferred at the beginning of the control period, "LeadingGuardBand" refers to the guard band size in advance of the data packet, and "TrailingGuardBand" refers to the guard band size at the end of the data packet. As an example, in certain embodiments, the DataPacket may be 32 pixel clock cycles, the CRCcycle may be 56 pixel clock cycles, the ControlPreamble may be 8 pixel clock cycles, the LeadingGuardBand may be 2 pixel clock cycles, and the TrailingGuardBand may be 2 pixel clock cycles. In this example, V_LIMIT would be 100 pixel clock cycles.

The horizontal limit H_LIMIT denotes the data packet size of the audio and auxiliary data, i.e., a data island period, when a current pixel is located in the horizontal blanking field. The horizontal limit H_LIMIT may be defined as shown in Equation 2.

$$H\_LIMIT = SyncClock + CRCcycle + ControlPreamble + \\ LeadingGuardBand + DataPacket + TrailingGuardBand \quad \text{[Equation 2]}$$

In Equation 2, "SyncClock" refers to a horizontal synchronization signal. By way of example, when the SyncClock, CRCcycle, ControlPreamble, LeadingGuardBand, DataPacket, and TrailingGuardBand are 4, 56, 8, 2, 32, and 2 pixel clock cycles, respectively, H_LIMIT is 104 pixel clock cycles.

The vertical size V_LEFT_SIZE denotes a minimum number of pixel clocks that should be present to transfer the audio and auxiliary data in a current horizontal line when a current pixel is located in the vertical blanking field, which may be defined according to embodiments of the present invention as in Equation 3.

$$V\_LEFT\_SIZE = ControlPeriod + \\ DataIslandPeriod + ControlPeriod + \\ VideoDataPeriod's\ LeadingGuardBand \quad \text{[Equation 3]}$$

In Equation 3, DataIslandPeriod corresponds to the vertical limit V_LIMIT, and VideoDataPeriod's LeadingGuardBand refers to the guard band size in advance of a video data period.

The horizontal size H_LEFT_SIZE refers to a minimum number of pixel clocks that should be present to transfer the audio and auxiliary data in a current horizontal line when a current pixel is located in the horizontal blanking field, which may be defined according to certain embodiments of the present invention as shown in Equation 4.

$$H\_LEFT\_SIZE = ControlPeriod + DataIslandPeriod + ControlPeriod + VideoDataPeriod\text{'s } LeadingGuardBand \quad \text{[Equation 4]}$$

In Equation 4, DataIslandPeriod corresponds to the horizontal limit H_LIMIT.

The vertical blank V_BLANK represents the number of vertical blanking lines, which, is 45 lines in the example of FIG. 2. The horizontal blank H_BLANK represents the number of horizontal blanking pixels, which is 138 pixels in the example of FIG. 2.

Referring again to FIG. 3, the data packet block 320 accepts the auxiliary data AUX_DATA from the register set block 310 and the audio data ("DATA") from a video scaler (not shown), and generates a ready signal READY. The data packet block 320 also outputs packet data P_DATA, which is packetized from the auxiliary data AUX_DATA and/or the audio data DATA, in response to a transmission control signal DONE.

The control block 330 generates the control signal DONE in response to the video formation information, i.e., V_LIMIT, H_LIMIT, LINE_RES, V_LEFT_SIZE, H_LEFT_SIZE, V_BLANK, and H_BLANK, the vertical sync signal V_SYNC, the horizontal sync signal H_SYNC, a pixel clock signal P_CLK, the ready signal READY provided from the data packet block 320. The control signal DONE is provided to the data packet block 320.

Figure 4:
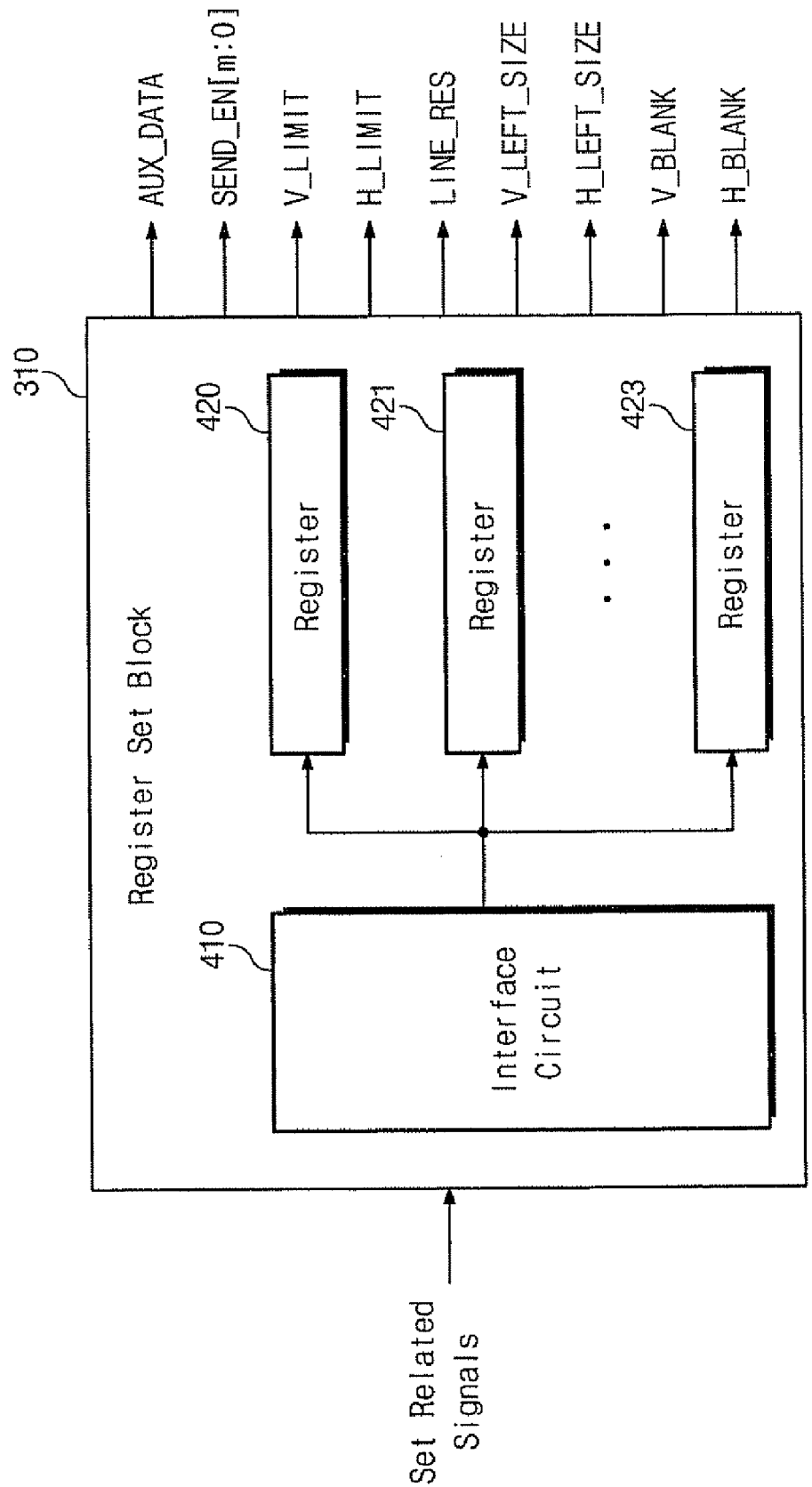
FIG. 4 is a detailed block diagram illustrating a register set block in accordance with embodiments of the present invention.

FIG. 4 is a detailed block diagram illustrating one implementation of the register set block 310 in accordance with certain embodiments of the present invention. As shown in FIG. 4, the register set block 310 includes an interface circuit 410 and a plurality of registers 420~423. The interface circuit 410 stores set data into the registers 420~423 from the external source. For instance, data stored in the registers 420~423 may include V_LIMIT, H_LIMIT, LINE_RES, V_LEFT_SIZE, H_LEFT_SIZE, V_BLANK and H_BLANK.

Figure 5:
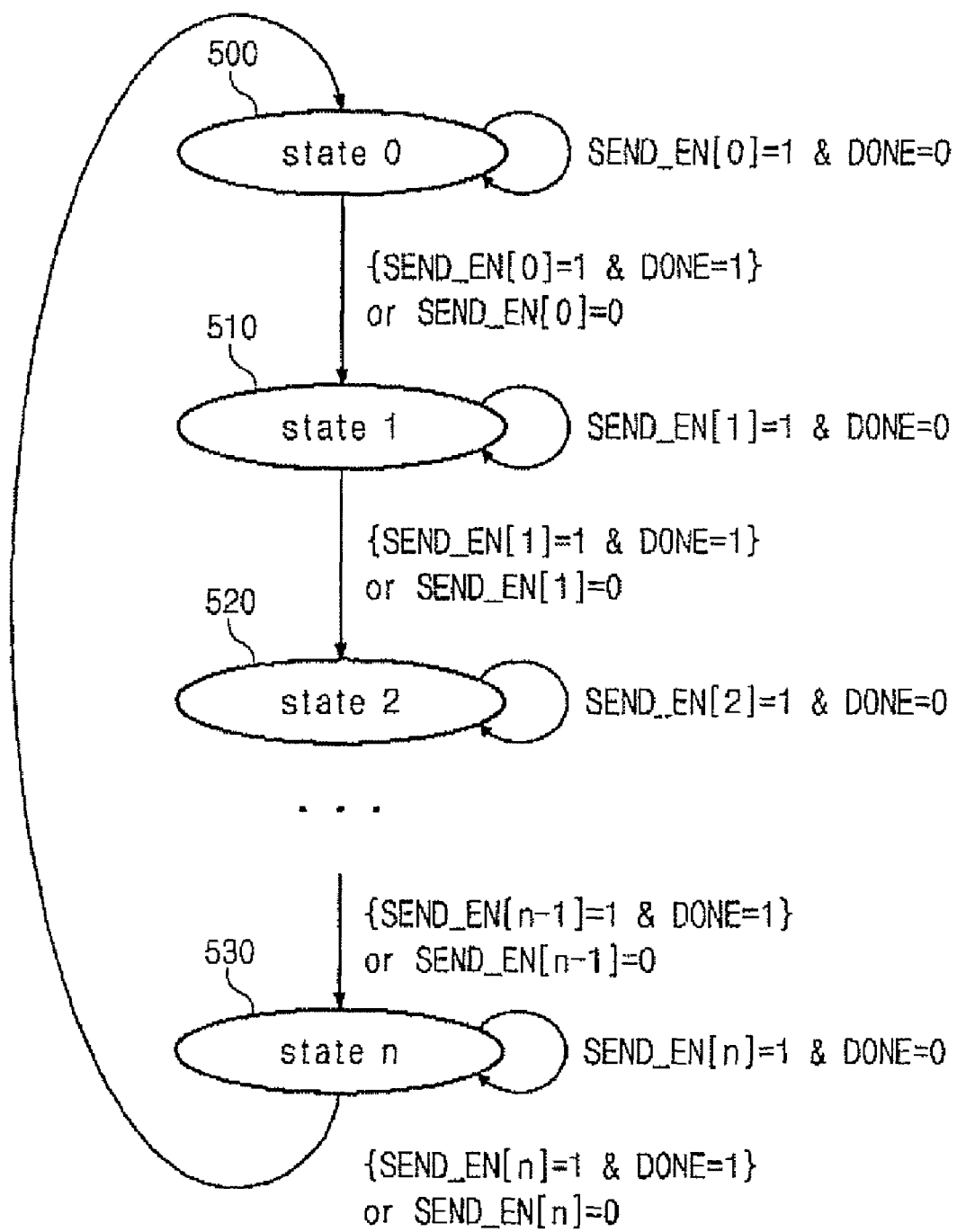
FIG. 5 is a state diagram illustrating operations of a data packet block according to embodiments of the present invention.

FIG. 5 is a state diagram that illustrates operations of a data packet block 320 according to embodiments of the present invention. The data packet block 320 includes n states 500~530 (where "n" is the same as "m" in FIG. 3). Each state corresponds to the auxiliary data AUX_DATA and the audio data. The data packet block 320 is in state_0 500 when a transmission enabling signal SEND_EN[0] is active with logic "1" and the control signal DONE is at a low level (logic "0").

Once the data packet block 320 has received auxiliary and/or audio data, the data packet block 320 shown in FIG. 3 activates the ready signal READY with high level of logic "1" in the state_0 500. If the control signal DONE is at logic "0" when the READY signal transitions to logic level "1", packet data P_DATA made from the audio or auxiliary data corresponding thereto is generated by the data packet block 320.

When the transmission enabling signal SEND_EN[0] is set on logic "1" and the control signal DONE is logic "1" or when the transmission enabling signal SEND_EN[0] is inactive with logic "0", the ready signal READY goes to low level of logic "0" and the state_0 500 turns to the state_1 510.

The state_1 510 is maintained when the transmission enabling signal SEND_EN[1] is set on logic "1" and the control signal DONE is at a low level (logic "0"). At the state_1 510, the ready signal READY is set to a high level (logic level "1").

In this manner, the state transition proceeds from the state_0 500 to the state_n 530 in sequence. When the transmission enabling signal SEND_EN[n] is set to logic "1" and the control signal DONE is set to logic "1", or when the transmission enabling signal SEND_EN[n] is set to logic "0", the state_n 530 turns to the state_0 500. By transition from the state_0 500 to the state_n 530, the audio data and the auxiliary data are packetized. The packet data P_DATA output from the data packet block 320 is transformed into a signal suitable for the TMDS channel and is then transferred to the HDMI sink 120 as shown in FIG. 1.

Figure 6:
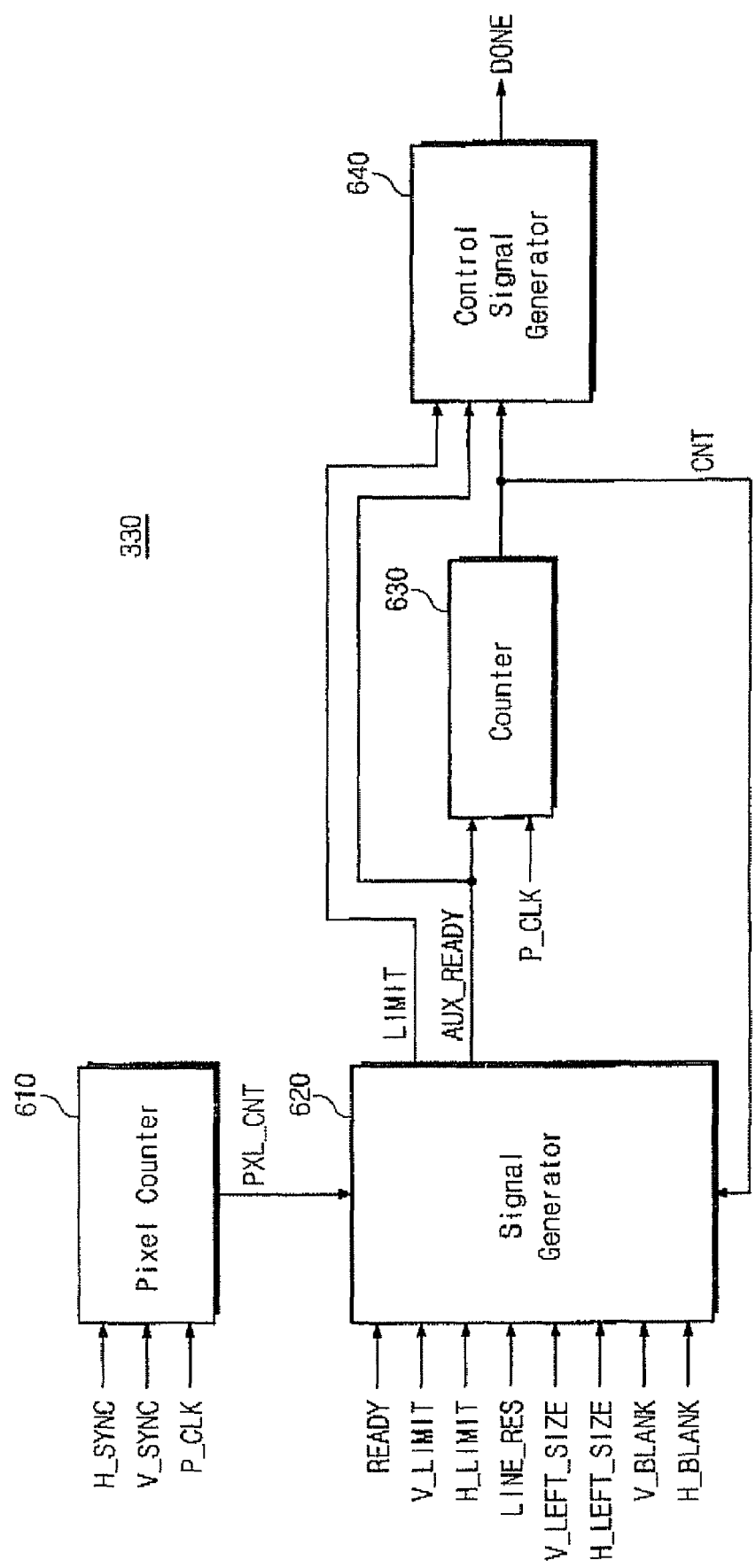
FIG. 6 is a block diagram illustrating a circuit structure for the control block of FIG. 3 according to certain embodiments of the present invention.

FIG. 6 is a block diagram illustrating an implementation of the control block 330 of FIG. 3 according to some embodiments of the present invention. As shown in FIG. 6, the control block 330 may include a pixel counter 610, a signal generator 620, a counter 630, and a control signal generator 640. The pixel counter 610 receives the horizontal sync signal H_SYNC, the vertical sync signal V_SYNC, and the pixel clock signal P_CLK, and outputs a pixel counting value PXL_CNT in sync with the pixel clock signal P_CLK. The pixel counter 610 is reset by the horizontal and/or vertical sync signals H_SYNC and V_SYNC.

The signal generator 620 receives the ready signal READY from the data packet block 320, the vertical limit V_LIMIT, the horizontal limit H_LIMIT, the horizontal resolution LINE_RES, the vertical size V_LEFT_SIZE, the horizontal size H_LEFT_SIZE, the vertical blank V_BLANK, and the horizontal blank H_BLANK from the register set block 310, and a counting value CNT from the counter 630, and outputs a limit signal LIMIT and an auxiliary ready signal AUX_READY.

The counter 630 receives the auxiliary ready signal AUX_READY and the pixel clock signal P_CLK, and outputs the counting value CNT.

The control signal generator 640 receives the signals LIMIT and AUX_READY from the signal generator 620 and the counting value CNT from the counter 630, and outputs the control signal DONE. The control signal DONE is provided from the control signal generator 640 to the data packet block 320 as shown in FIG. 3.

Figure 7:
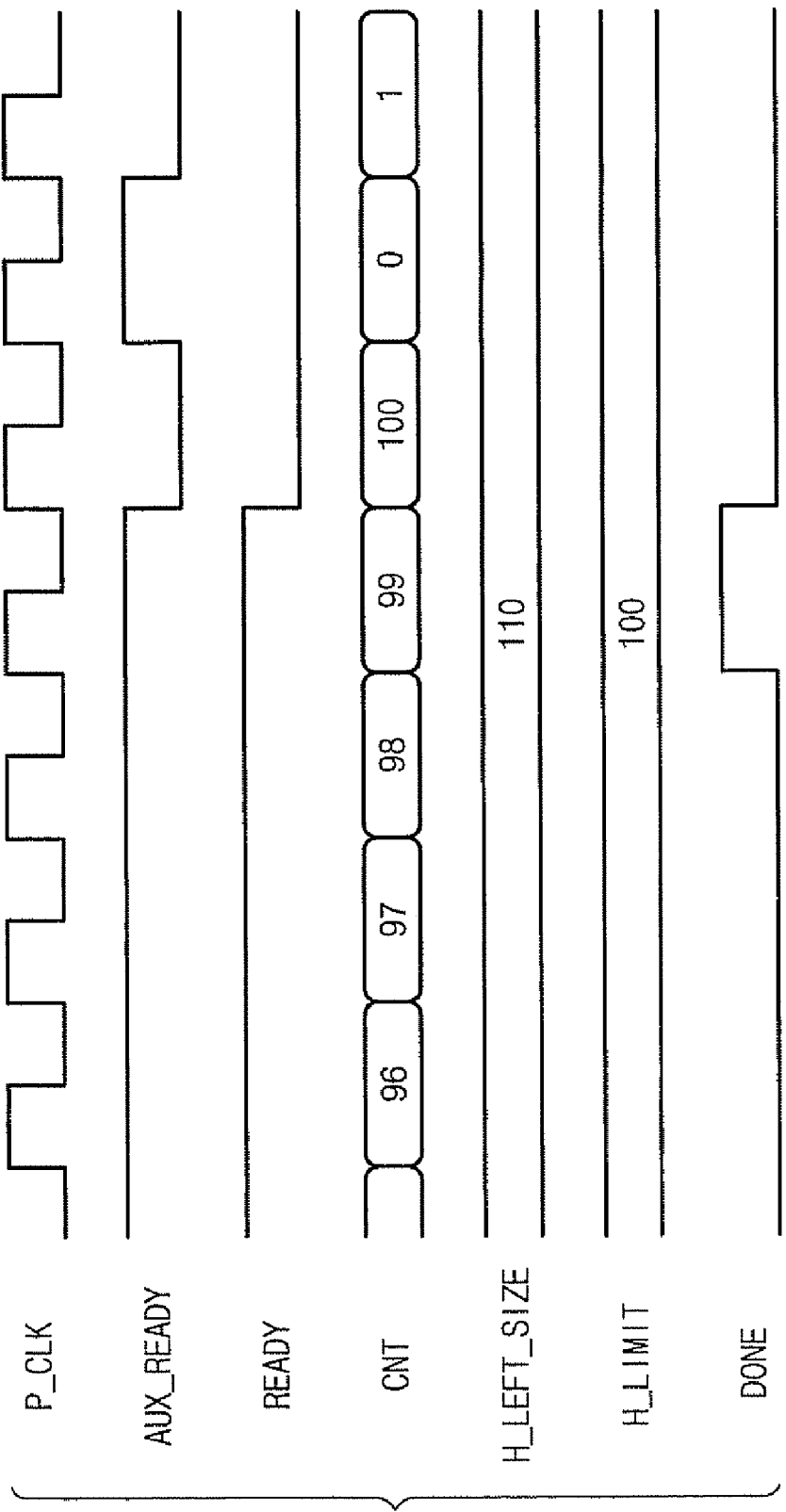
FIG. 7 is a timing diagram showing signals input into and output from the control block shown in FIG. 6.
Figure 8:
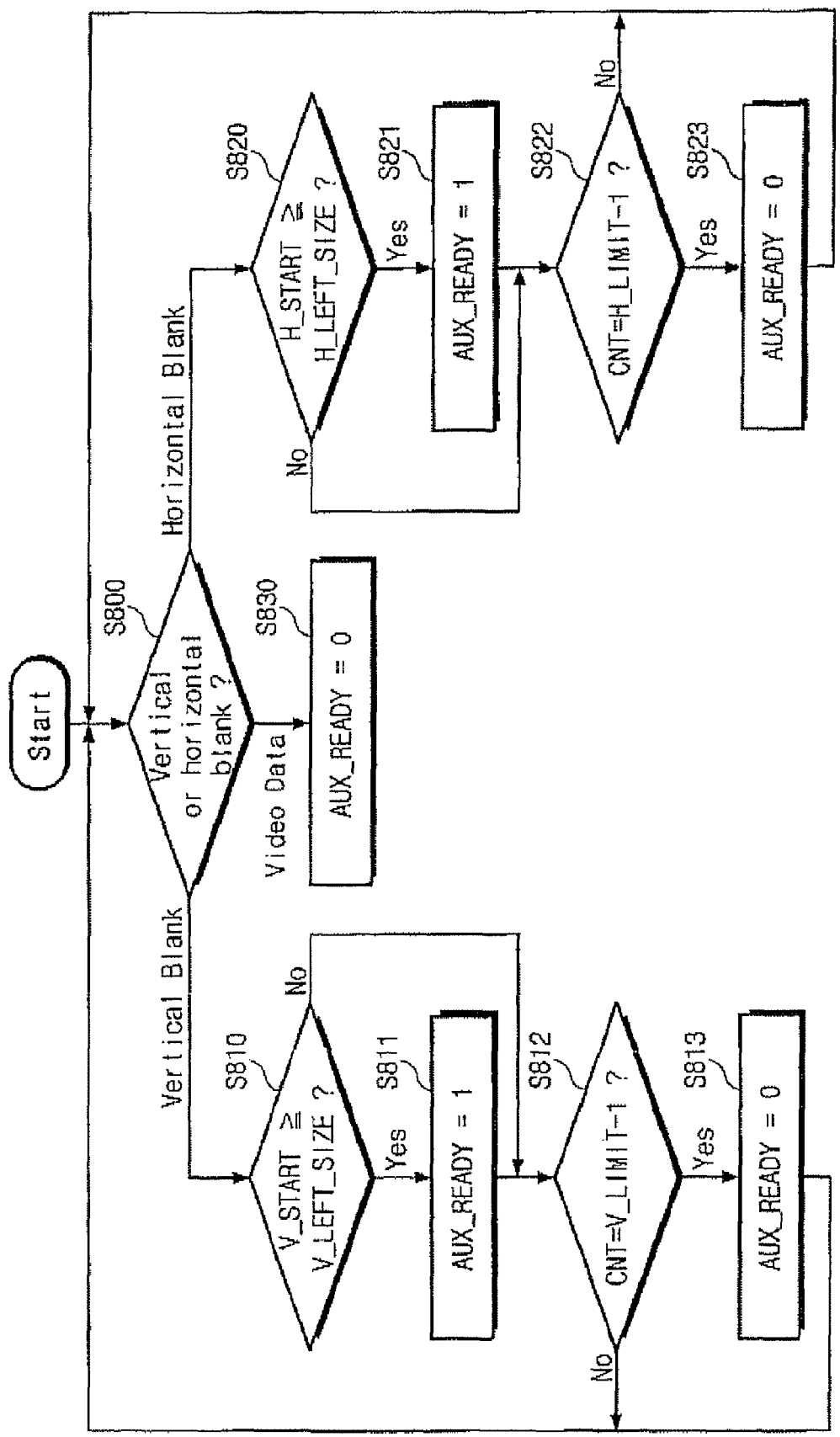
FIG. 8 is a flow chart showing a control sequence for a control signal generator in the control block of FIG. 6 according to embodiments of the present invention.

FIG. 7 is a timing diagram showing signals input into, and output from, the control block 330 of FIGS. 3 and 6. FIG. 8 is a flow chart showing a control sequence for the signal generator 620 in the control block 330 of FIGS. 3 and 6.

Operations of the control block 330 will now be described for the case where the data packet block 320 is in the state_0 500 shown in FIG. 5. As discussed above, in the state_0 500 for transferring the audio and auxiliary data, the ready signal READY is activated to a high level. In response to the activation of the ready signal READY, the signal generator 620 generates the signal AUX_READY in response to the signals V_LIMIT, H_LIMIT, LINE_RES, V_LEFT_SIZE, and H_LEFT_SIZE provided from the register set block 310, and the pixel counting value PXL_CNT provided from the pixel counter 610.

The signal generator 620 executes the control operation given by FIG. 8 when the ready signal READY stays on logic "1." As shown in FIG. 8, at step S800 a determination is made as to whether the beginning point of a current pixel for transferring audio and auxiliary data is located in the vertical or horizontal blanking field. If the current pixel belongs to the vertical blanking field, the control procedure proceeds to step S810.

At step S810, a determination is made as to whether V_START≧V_LEFT_SIZE, where V_START=LINE_RES− PXL_CNT. If V_START≧V_LEFT_SIZE, the control procedure proceeds to step S811. If not, the control procedure skips to step S812.

At step S811, the signal AUX_READY is set to a high level (logic level "1").

At step S812, a determination is made as to whether the signal generator 620 is operating under the condition of CNT=V_LIMIT−1. If it is, the control procedure proceeds to step S813. If not, the control procedure returns to step S800.

At step S813, the signal AUX_READY is set to low level (logic level "0"), and the control procedure returns to step S800.

At step S800, if a beginning point to transfer the audio and auxiliary data is positioned in the horizontal blanking field, the control procedure goes to step S820.

At step S820, a determination is made as whether H_START≧H_LEFT_SIZE, where H_START=H_BLANK−PXL_CNT. If the condition is satisfied, the control procedure proceeds to step S821. If not, the control procedure skips to step S822.

In step S821, the signal AUX_READY is set to a high level (logic level "1").

At step S822, a determination is made as to whether the signal generator 620 is operating under the condition of CNT=H_LIMIT−1. If it is, the control procedure proceeds to step S823. If not, the control procedure returns to step S800.

In step S823, the signal AUX_READY is set to a low level (logic level "0"), and the control procedure returns to the step S800.

From the determination by the step S800, if a current pixel is positioned in the video data field (i.e., in neither the vertical or horizontal blanking field), the signal AUX_READY is set to a low level by the step S830. The signal generator 620 sets the logical level of the signal AUX_READY.

Figure 9:
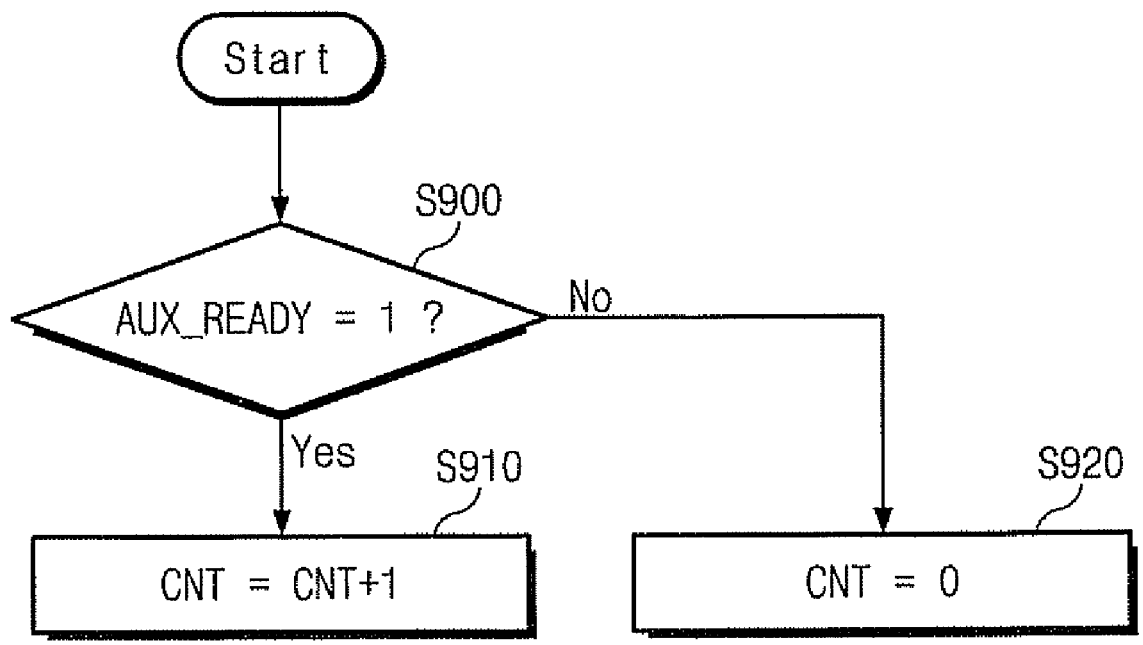
FIG. 9 is a flow chart showing an operation of a counter in the control block of FIG. 6 according to embodiments of the present invention.

FIG. 9 is a flow chart illustrating the operation of the counter 630 in the control block 330 of FIG. 6 according to some embodiments of the present invention. At step S900, the counter 630 detects the logic level of the signal AUX_READY from the counter 630. If the signal AUX_READY is set to logic level "1", operations proceed to step S910 where the counting value CNT is increased by 1. If the signal AUX_READY is set to logic level "0", operations proceed to step S920 where the counting value CNT is reset to zero. The counting value CNT is supplied to the signal generator 620 and the control signal generator 640 as shown in FIG. 6.

Figure 10:
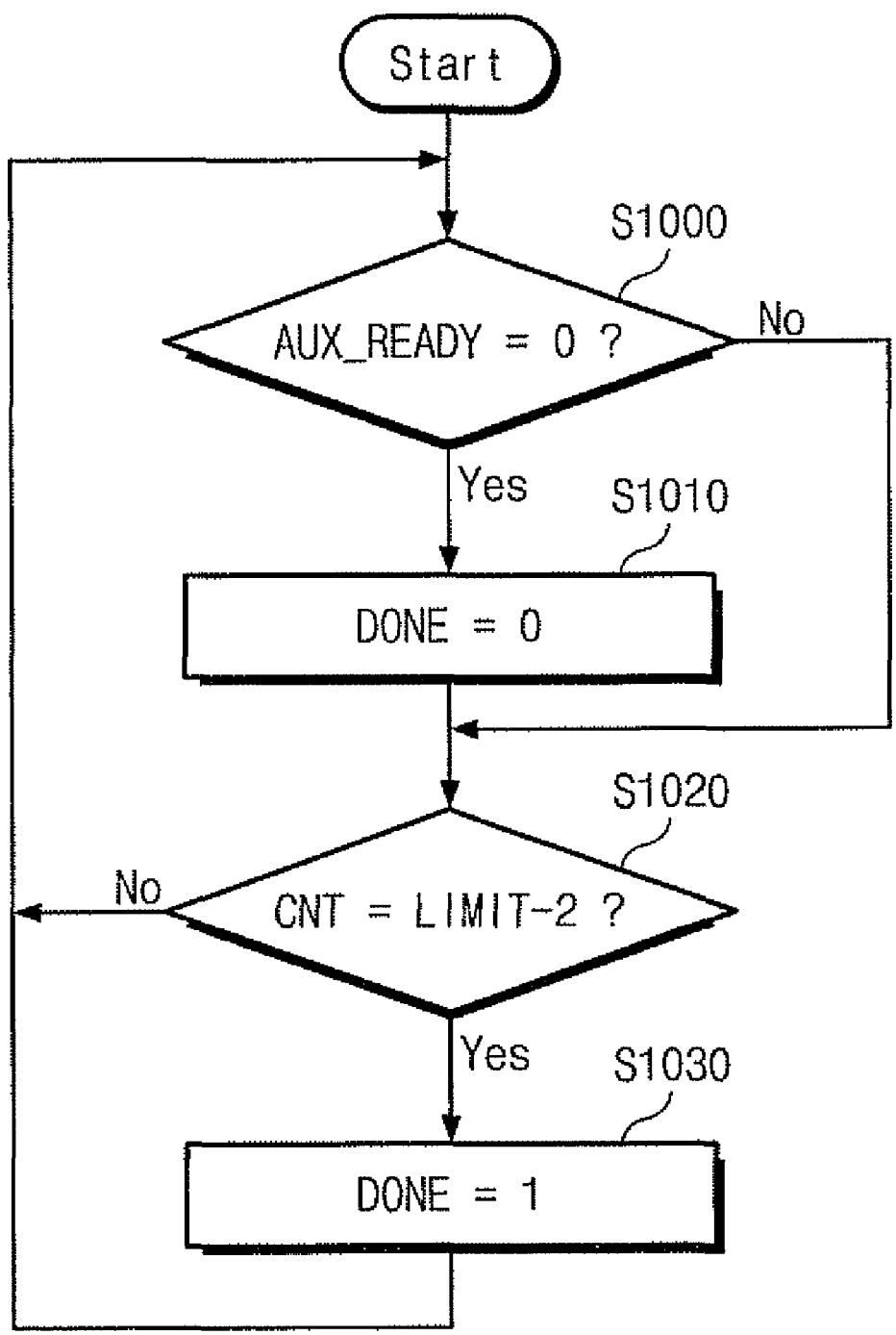
FIG. 10 is a flow chart showing a control sequence for a control signal generator in the control block of FIG. 6 according to embodiments of the present invention.

FIG. 10 is a flow chart illustrating a control sequence for the control signal generator 640 of FIG. 6, which may be part of the control block 330 of FIG. 3 in some embodiments of the present invention. At step S1000, the control signal generator 640 detects the logic level of the signal AUX_READY. If the signal AUX_READY is set to logic level "0", operations proceed to step S1010. At step S1010, the control signal generator 640 sets the signal DONE to logic level "0." If instead at step S1000 the signal AUX_READY is at logic level "1", operations skip to step S1020. At step S1020, a determination is made as to whether the counting value CNT equals the vertical limit V_LIMIT minus 2 or the horizontal limit H_LIMIT minus 2 (i.e., CNT=V_LIMIT−2 or CNT=H_LIMIT−2). If CNT=V_LIMIT−2 or CNT=H_LIMIT−2, operations proceed to step S1030 where the signal DONE is set to logic level "1." Then, the control procedure returns to the step S1000.

Referring to FIG. 7, in a case where the horizontal limit H_LIMIT is 100 and the horizontal size H_LEFT_SIZE is 110, the signal DONE is set to logic level "1" at the counting value CNT=H_LIMIT−2, that is 98. As the signal DONE transitions to logic level "1", the state_0 500 turns to the state_1 510. When the counting value CNT reaches H_LIMIT−1 that is 99, the signal DONE is reset to logic level "0." As such, the control block 330 properly outputs the control signal DONE on basis of the current pixel position and the information about video formation established in the register set block 310.

Figure 11:
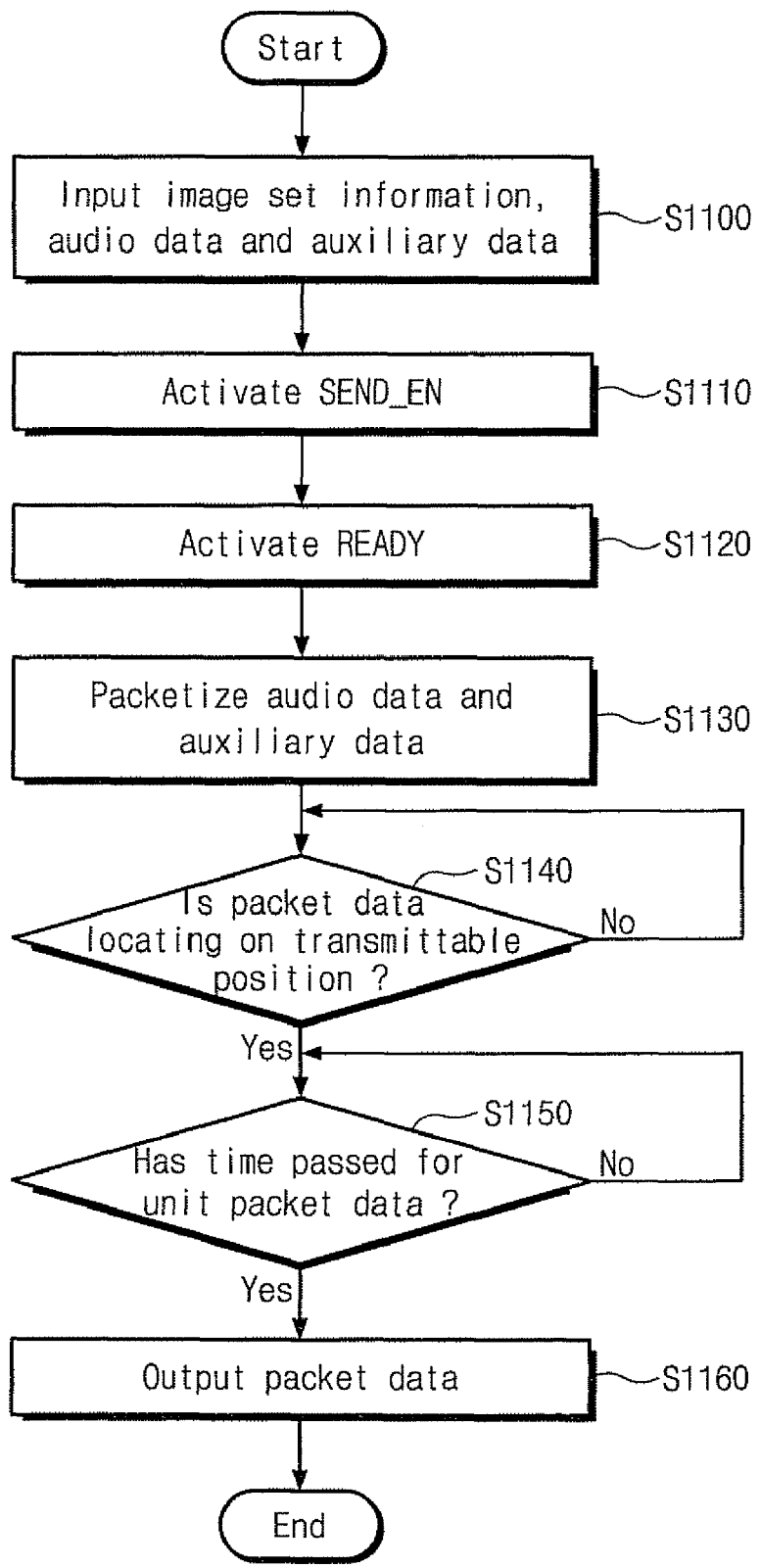
FIG. 11 is a flow chart illustrating the operation of a transmission system according to certain embodiments of the present invention.

FIG. 11 is a flow chart summarizing an overall operation of the transmission system 300.

As shown in FIG. 11, the video formation information and auxiliary data are input to the register set block 310 from the scaler (not shown) or a video processing circuit (not shown) at step S1100. The audio data is input to the data packet block 320. After activation of the transmission enabling signals SEND_EN[m:0] at step S1110, the data packet block 320 activates the ready signal READY at step S1120 and then packetizes the audio and auxiliary data at step S1130. The control block 330 determines whether a current pixel is located at a position that is suitable for packet data transmission, in response to the ready signal READY at step S1140. If the current pixel position is suitable for packet data transmission, the control block 330 determines if a predetermined time corresponding to a unit of packet data has elapsed from the activation point of the ready signal READY at step S1150. When the predetermined time for the packet data unit has lapsed, the control block 330 sets the signal DONE to logic level "1." The data packet block 320 then outputs packet data P_DATA in response to the signal DONE being set to logic level "1" at step S1160.

As aforementioned, the invention is advantageous to packetizing audio and auxiliary data in compliance with the HDMI standard.

The present invention may be embodied as both methods and as transmission systems. Functionality for implementing aspects of the present invention may take the form of a hardware embodiment, a software embodiment or an embodiment combining software and hardware aspects, all generally referred to herein as a "circuit" or "block." Furthermore, aspects of the present invention may take the form of a computer program product on a computer-usable storage medium having computer-usable program code embodied in the medium. Any suitable computer readable medium may be utilized including hard disks, CD-ROMs, optical storage devices, a transmission media such as those supporting the Internet or an intranet, or magnetic storage devices.

The present invention is described herein with reference to flowchart illustrations and block diagrams of methods and systems according to embodiments of the invention. It will be understood that various blocks of the flowchart illustrations and block diagrams, and combinations of blocks in the flowchart illustrations and block diagrams, can be implemented by computer program instructions. These computer program instructions may be provided to a processor to produce a machine such that the instructions, which execute via the processor to implement the functions/acts specified in the flowchart and block diagram block or blocks.

In the drawings and specification, there have been disclosed typical embodiments of the invention and, although specific terms are employed, they are used in a generic and descriptive sense only and not for purposes of limitation, the scope of the invention being set forth in the following claims.

What is claimed is:

1. A method for transferring audio and/or auxiliary data in a video frame, the method comprising:
   receiving video formation information and the audio and/or auxiliary data;
   activating a transmission enable signal;
   activating a first signal;
   packetizing the audio and/or auxiliary data at a data packet block in response to the transmission enable signal;
   determining at a control block, in response to the first signal, whether a current pixel in the video frame is in a position that is suitable for transmission of a first unit of the packetized audio and/or auxiliary data based on at least some of the video formation information;
   determining at the control block that a predetermined time corresponding to the unit of packetized audio and/or auxiliary data has elapsed from the activation of the first signal, and then activating a control signal; and
   outputting the first unit of the packetized audio and/or auxiliary data from the data packet block in response to the control signal.

2. The method of claim 1, wherein the video formation information includes a data packet size of the audio and/or auxiliary data for data packets transferred in a horizontal blanking field, a data packet size of the audio and/or auxiliary data for data packets transferred in a vertical blanking field, the number of vertical blanking lines and the number of horizontal blanking pixels.

3. The method as set forth in claim 1, wherein the video formation information is received at a register set block, and wherein the register set block is configured to generate the transmission enable signal.

4. The method as set forth in claim 3, wherein the register set block is further configured to store the auxiliary data.

5. The method as set forth in claim 4, wherein the register set block comprises:
   a plurality of registers that are configured to store the video formation information and the auxiliary data; and
   an interface circuit that is configured to receive the video formation information from an external source and to store the video formation information into at least some of the plurality of registers.

6. The method as set forth in claim 1, wherein the data packet block is operable at a plurality of states corresponding to the audio data and the auxiliary data, and wherein the data packet block activates the first signal in response to entering each state, and wherein the data packet block outputs the packetized audio and/or auxiliary data in response to the transmission enable signal and the control signal.

7. The method as set forth in claim 6, wherein the data packet block is configured to packetize the audio and/or auxiliary data when the transmission enable signal is active and the control signal is at a first level.

8. The method as set forth in claim 7, wherein the data packet block transitions to the next state when the transmission enable signal becomes inactive or the control signal is set to a second level.

9. The method as set forth in claim 1, wherein the control block comprises:
   a first counter that is configured to generate a first value based on a count of a pixel clock signal;
   a second counter that is configured to generate a second value based on a count of the pixel clock signal;
   a signal generator that is configured to output a second signal based on the first and second values and the video formation information; and
   a control signal generator that is configured to output the control signal based on the second signal and the second value.

10. The method as set forth in claim 9, wherein the first counter is reset in response to a horizontal sync signal and a vertical sync signal.

11. The method as set forth in claim 9, wherein the signal generator activates the second signal when the first signal is active and the first value indicates that the current pixel is located in a portion of a blanking period that has sufficient room for the first unit of the packetized audio and/or auxiliary data.

12. The method as set forth in claim 11, wherein the signal generator inactivates the second signal when the second value is one less than a size of the first unit of the packetized audio and/or auxiliary data.

13. The method as set forth in claim 12, wherein the second counter starts counting in response to the activation of the second signal, and is reset in response to the deactivation of the second signal.

14. The method as set forth in claim 12, wherein the control signal generator is configured to set the control signal to the first level in response to the deactivation of the second signal.

15. The method as set forth in claim 14, wherein the control signal generator is configured to set the control signal to the second level when the second value is the size of the first unit of the packetized audio and/or auxiliary data.

16. The method as set forth in claim 14, wherein the control signal generator is configured to set the control signal to the second level when the second value is within two of a size of the first unit of the packetized audio and/or auxiliary data.

17. A method for transferring audio and/or auxiliary data in a video frame, the method comprising:
   receiving video formation information and the audio and/or auxiliary data;
   activating a transmission enable signal;
   activating a first signal;
   packetizing the audio and/or auxiliary data in response to the transmission enable signal;
   determining, in response to the first signal, whether a current pixel in the video frame is in a position that is suitable for transmission of the packetized audio and/or auxiliary data based on at least some of the video formation information; and
   outputting the packetized audio and/or auxiliary data in response to determining that the current pixel in the video frame is in a position that is suitable for transmission of the packetized audio and/or auxiliary data
   wherein determining that a current pixel in the video frame is in a position that is suitable for transmission of the packetized audio and/or auxiliary data based on at least some of the video formation information comprises:
   determining if sufficient time remains in a horizontal line of the video frame from the activation of the first signal to transfer a first unit of the packetized audio and/or auxiliary data;
   activating a second signal if it is determined that sufficient time remains, and
   wherein determining that a current pixel in the video frame is in a position that is suitable for transmission of the packetized audio and/or auxiliary data based on at least some of the video formation information further comprises:
   determining whether a time corresponding to a size of the first unit has elapsed from an activation point of the second signal.

18. The method as set forth in claim 17, the method further comprising:
 counting the cycles of a pixel clock to generate a first value; and
 counting the cycles of the pixel clock starting at the activation of the second signal to generate a second value.

19. The method as set forth in claim 18, the method further comprising:
 resetting the first value in response to a horizontal sync signal and/or a vertical sync signal.

20. The method as set forth in claim 19, wherein the second value is reset in response to deactivation of the second signal.

21. The method as set forth in claim 20, wherein outputting the packetized audio and/or auxiliary data in response to determining that the current pixel in the video frame is in a position that is suitable for transmission of the packetized audio and/or auxiliary data comprises:
 outputting the packetized audio and/or auxiliary data when the second value is two cycles less than the number of clock cycles which is necessary for transferring the first unit.

* * * * *